United States Patent
Dehner

[15] 3,652,440
[45] Mar. 28, 1972

[54] SPARK SENSING SYSTEM FOR ECM APPARATUS

[72] Inventor: Gareth A. Dehner, Cincinnati, Ohio
[73] Assignee: Cincinnati Milacron Inc., Cincinnati, Ohio
[22] Filed: Nov. 12, 1968
[21] Appl. No.: 774,812

[52] U.S. Cl. .........................................204/228, 204/143 M
[51] Int. Cl. .........................................B01k 3/00, B23p 1/04
[58] Field of Search .............................204/224, 228, 143 M

[56] References Cited

UNITED STATES PATENTS

| 3,433,728 | 3/1969 | Petroff | 204/288 X |
| 3,480,537 | 11/1969 | Garnett | 204/224 |
| 3,496,088 | 2/1970 | Pfau et al. | 204/228 X |
| 3,520,791 | 7/1970 | Pfau et al. | 204/228 X |
| 3,524,804 | 8/1970 | Gotz et al. | 204/228 X |
| 3,533,927 | 10/1970 | Manning | 204/224 X |
| 3,548,257 | 12/1970 | Drushel et al. | 204/224 X |

FOREIGN PATENTS OR APPLICATIONS

| 397,467 | 3/1962 | Japan | 204/143 |

Primary Examiner—John H. Mack
Assistant Examiner—D. R. Valentine
Attorney—Frank C. Leach, Jr.

[57] ABSTRACT

A sensing system responds only to high frequency voltages created by sparks to shut down an electrochemical machining apparatus. The system includes means to prevent shutting down of the apparatus due to noise.

11 Claims, 5 Drawing Figures

INVENTOR.
GARETH A. DEHNER

BY Frank C. Leach Jr.

ATTORNEY.

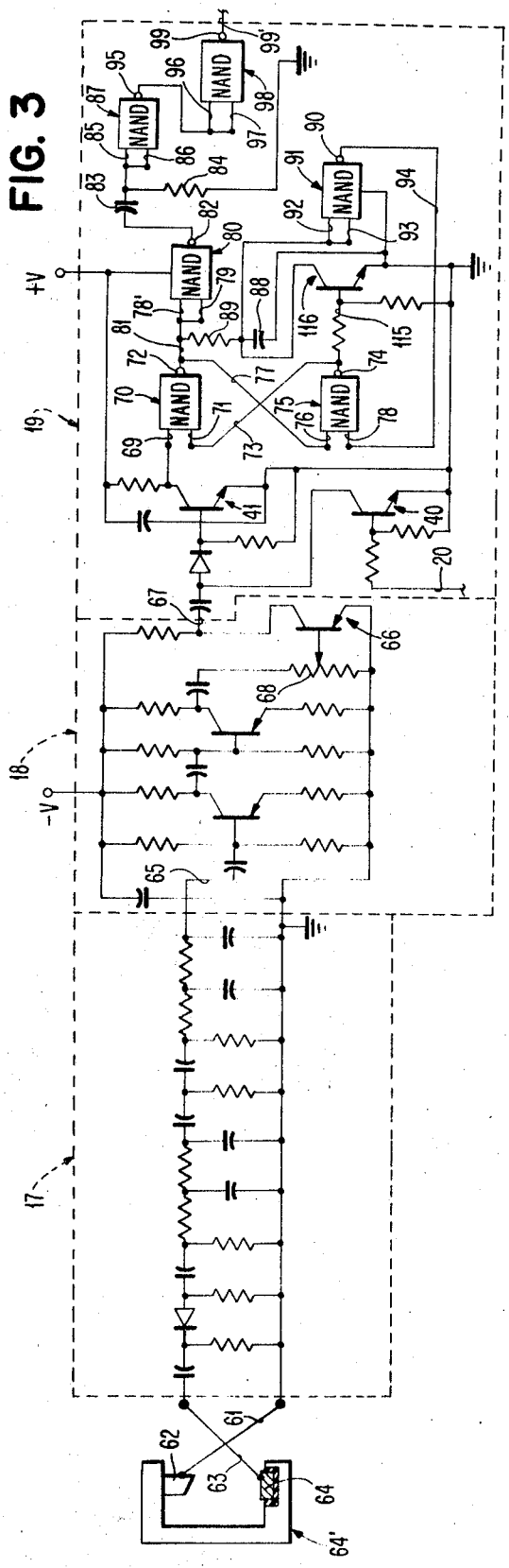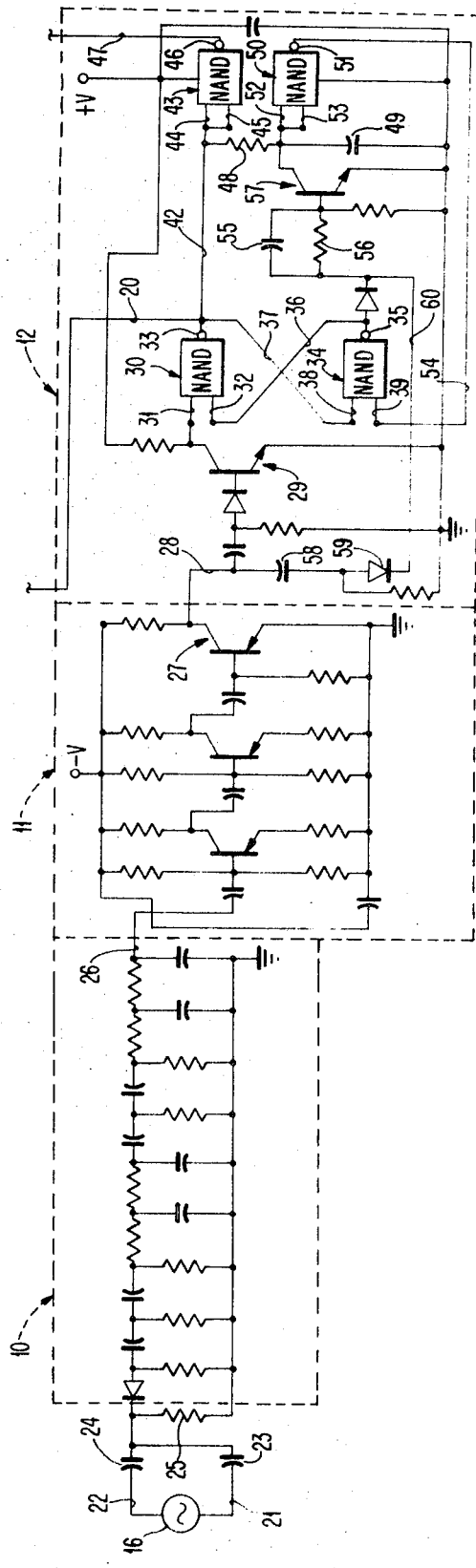

SPARK SENSING SYSTEM FOR ECM APPARATUS

In electrochemical machining (ECM), it is possible to machine with no wear of the tool. However, if the tool contacts the workpiece, any sparking resulting therefrom damages the tool and the workpiece. Accordingly, to limit damage to the tool and the workpiece to a minimum, it is necessary to stop the machining operation whenever a spark occurs.

When a spark occurs, a high frequency voltage occurs at the machining gap so that a spark is readily detectable through observing the existence of a high frequency voltage across the machining gap. However, electrical noises from other sources also produce high frequency voltages across the gap too. Therefore, if machining is stopped whenever a high frequency voltage exists across the machining gap, the time period for machining would be substantially extended so as to make the ECM process too expensive for economic utilization.

The present invention satisfactorily solves the foregoing problem by providing a system in which machining is stopped only when a spark exists across the machining gap. The system of the present invention will not cause stopping of machining when a high frequency voltage exists across the gap due to noise, for example. Thus, damage to the tool by sparks is maintained at a minimum by use of the present detecting system while still obtaining a relatively high speed machining operation since there is no shut down of the machining apparatus due to high frequency voltages across the gap created by noise, for example.

When using the system of the present invention, the sensitivity of the detecting system is independent of both the voltage and the current at the machining gap. Accordingly, there is no requirement for changing the sensitivity for different types of machining jobs. Therefore, the present invention not only permits quicker machining of a workpiece but also reduces the time between machining jobs since there is no requirement for any type of adjustment due to changes in the machining job.

An object of this invention is to provide a method and apparatus for stopping an ECM apparatus when a spark exists across the machining gap.

Another object of this invention is to provide a device vice that responds only to high frequency voltages across a machining gap of an ECM apparatus that are produced by sparks across the gap.

Other objects of this invention will be readily perceived from the following description, claims, and drawings.

This invention relates to an electrical sensing system for sensing a spark across a machining gap of an ECM apparatus. This system includes means to detect the presence of a high frequency voltage across the gap and means to stop the machining when the detecting means is activated. The system also has means to prevent actuation of the stop means when the detecting means is activated by noise.

This invention also relates to an electrical sensing system for sensing a spark across a machining gap of an ECM apparatus including first means to detect the presence of a high frequency voltage across the gap and second means to produce an output in response to noise in the frequency range of the gap voltage. The system has third means, which receives inputs from the first and second means and produces an output when it receives an input only from the first means, with means responsive to the output from the third means to stop machining.

This invention further relates to a method of determining when a spark exists across the gap of an ECM apparatus. The method includes sensing all signals across the gap in a predetermined frequency range and selecting from the sensed signals a high frequency voltage appearing only across the gap. The machining operation is stopped when the high frequency voltage, which appears only across the gap, is selected.

The attached drawings illustrate a preferred embodiment of the invention, in which:

FIG. 2 is a schematic wiring diagram of filter and amplifier circuits for noise and of a pulse shaping and timing network for noise;

FIG. 3 is a schematic wiring diagram of filter and amplifier circuits receiving voltages across the machining gap and of a pulse shaping and timing network for the voltages produced across the machining gap;

Figure 1:
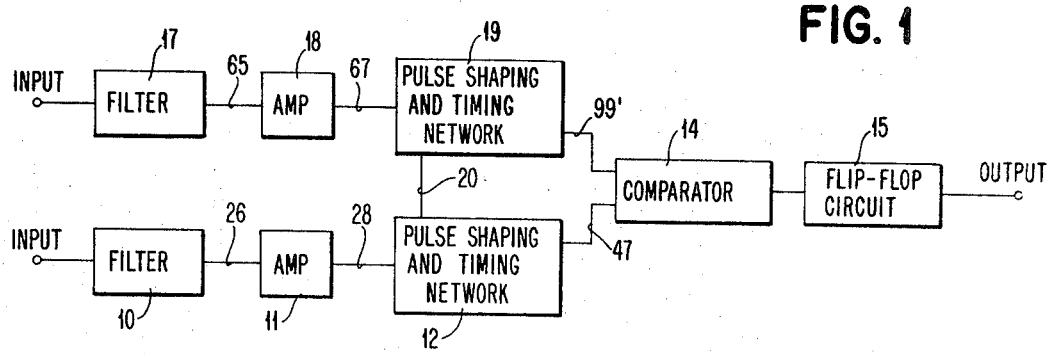
FIG. 1 is a schematic block diagram illustrating the detecting system of the present invention.

Referring to the drawings and particularly FIG. 1, there is shown a band pass filter 10 adapted to receive only noises within a certain frequency range, which is essentially the same frequency range as that of the voltages produced by sparks at the machining gap. This effectively filters any rectifier ripple noise or silicon controlled rectifier noise since both of these have a frequency different than the frequency, which is produced by the voltages created by the sparks at the machining gap. The output of the filter 10 is connected through an amplifier 11 to a pulse shaping and timing network 12. Whenever the network 12 receives a signal, it supplies this signal to a comparator 14 to prevent any output therefrom to a flip-flop circuit 15. Thus, whenever there is an output from the network 12 due to noise, there can be no output from the flip-flop circuit 15 to cause stopping of an ECM DC power supply (not shown), which is supplied from an AC source 16 (see FIG. 2).

A band pass filter 17 is connected to sense voltages across the machining gap within substantially the same frequency range as the filter 10. This frequency range includes all of the voltages created by the sparks across the machining gap. OF course, the filter 17 also receives the same noises, which are received by the filter 10. Accordingly, it is desired that only the voltages created by sparks in the machining gap and received by the filter 17 be utilized to produce an output from the flip-flop circuit 15 to stop the ECM power supply.

The filter 17 has its output amplified by an amplifier 18 and then supplied to a pulse shaping and timing network 19. Any input to the network 19 from the amplifier 18 is received only if there is no signal previously supplied to the network 12 from the filter 10.

As shown in FIG. 1, a line 20 connects the network 12 to the network 19. When the network 12 receives noise, this supplies a signal from the network 12 to the network 19 by the line 20. If this signal arrives at the network 19 before a signal from the filter 17, there can be no output from the network 19 to the comparator 14. If this signal is supplied to the network 19 from the network 12 after a signal is received at the network 19, this prevents any output from the network 19 except for the signal that has been received. These conditions occur only when noise is received by the filter 10.

If a spark should exist across the machining gap, there would be no input to the filter 10 since it is not connected to the machining gap but only to the AC source 16. As a result, when a spark occurs, there is no signal from the network 12 to the network 19 by the line 20 so that the network 19 may supply an output to the comparator 14. Since there is no input to the network 12, there also is no output from the network 12 to the comparator 14. Accordingly, the only input to the comparator 14 is from the network 19. When this occurs, the comparator 14 supplies a signal to the flip-flop circuit 15 to cause it to produce an output. When this output from the flip-flop circuit 15 occurs, the ECM power supply is shut off.

As shown in FIG. 2, the AC source 16 has its output power lines, which form the input power lines for the ECM power supply, connected by leads 21 and 22 to the band pass filter 10. The lead 21 has a capacitor 23 therein while the lead 22 has a capacitor 24 therein. The capacitors 23 and 24 permit the passage of transient noise signals, which exist on the lines of the AC power source 16, while attenuating the normal 60 cycle line frequency.

The noise appears across a resistor 25, which is connected to the filter 10. As shown in FIG. 2, the filter 10 comprises a plurality of resistors and capacitors. These resistors and capacitors cooperate to allow the passage of only a selected frequency band of the noise appearing across the resistor 25. The band pass filter 10 passes noise in substantially the same frequency range as the signals passed by the band pass filter 17. As previously mentioned, the band pass filter 17 passes all voltages in the frequency range of the voltages created by sparks at the machining gap.

The output of the filter 10 is connected by a lead 26 to the amplifier 11. The amplifier 11 comprises three PNP transistors. Accordingly, when a transistor 27 of the amplifier 11 conducts due to an input to the amplifier 11 through the lead 26, the voltage on a lead 28, which connects the amplifier 11 to the pulse shaping and timing network 12, increase. This results in an NPN transistor 29 of the network 12 conducting since its base is connected to the lead 28 and becomes more positive. The emitter of the transistor 29 is grounded while its collector is connected to a positive voltage source.

When the transistor 29 conducts, the voltage at its collector decreases whereby an input to a NAND gate 30 by its input pin 31 decreases. Since the signal on a second input pin 32 to the NAND gate 30 remains high as it was prior to the transistor 29 conducting, the voltage on output pin 33 of the NAND gate 30 increases from ground to positive.

Since the transistor 29 conducts for only a very short period of time because of the width of the pulse of the noise, the voltage on the input pin 31 increases shortly after it decreases since the transistor 29 turns off. However, before the voltage on the input pin 31 increases, the voltage on the input pin 32 decreases. This is because the output of a NAND gate 34, which has its output pin 35 connected by a lead 36 to the input pin 32 of the NAND gate 30, changes state.

While the output pin 35 of the NAND gate 34 is positive before the NAND gate 30 changes state due to the transistor 29 conducting, the increase in the voltage on the output pin 33 of the NAND gate 30 results in the voltage on the output pin 35 dropping to ground from positive. This is because the output pin 33 is connected by a lead 37 to an input Pin 39 of the NAND gate 34. This feedback from the NAND gate 30 produces a high voltage on the input pin 38 to the NAND gate 34. Since input pin 39 of the NAND gate 34 is positive and remains in that condition even when the NAND gate 30 changes its state, the introduction of the high voltage on the input pin 38 changes the state of the NAND gate 34. Therefore, the NAND gate 34 cooperates to maintain the NAND gate 30 in the state in which the output pin 33 has a positive voltage even after the transistor 29 ceases to conduct.

The increase of voltage on the output pin 33 of the NAND gate 30 is transmitted by the lead 20 to the base of an NPN transistor 40 of the network 19. As a result, when the transistor 40 conducts, any signals supplied to the pulse shaping and timing network 19 thereafter are directed through the transistor 40 to ground rather than to the base of an NPN transistor 41 of the network 19. Thus, no signal from the output of the amplifier 18 can pass through the network 19 after the transistor 40 conducts. This inhibits any further inputs to the network 19 until the transistor 40 ceases to conduct; this occurs only when there is no input to the transistor 40 from the network 12.

The output from the NAND gate 30 also is supplied by a lead 42 from the pin 33 to a NAND gate 43. Because the voltage on the output pin 33 of the NAND gate 30 is positive, this supplies a high voltage to the NAND gate 43 through both of input pins 44 and 45 of the NAND gate 43. As a result, the voltage on output pin 46 of the NAND gate 43 decreases from positive to ground and is supplied by a lead 47 as an input to the comparator 14. Whenever this ground input is received by the comparator 14, there can be no positive output from the comparator 14. Thus, this prevents any noise, which might pass through the network 19 due to a phase mismatch between the noise arriving at the filters 10 and 17, from causing the ECM power supply to be shut down.

The lead 42 also connects through a resistor 48 and a capacitor 49 to ground to charge the capacitor 49. The resistor 48 and the capacitor 49 cooperate together to form the timing portion of the network 12.

The RC constant of the resistor 48 and the capacitor 49 is selected so that the period of time during which the NAND gate 30 supplies a positive output on the pin 33 is sufficient that the output on the lead 47 from the network 12 does not cease until after any output from the network 19 to the comparator 14. Since the turning on of the transistor 40 inhibits any signals from the amplifier 18 to the network 19 after the transistor 40 is turned on, only noises received by the network 19 before the transistor 40 is turned on can be supplied to the comparator 14. It is these noises that the output on the lead 47 prevents from causing the comparator 14 to have an output.

When the capacitor 49 charges sufficiently so that the desired time period for the pulse to exist on the output lead 47 has existed, the voltage on the capacitor 49 becomes sufficiently positive to cause a NAND gate 50 to have the voltage on its output pin 51 drop from positive to ground. This is because the input voltage on the NAND gate 50 by input pins 52 and 53 from the capacitor 49 becomes sufficiently high that the NAND gate 50 changes state and the voltage on the output pin 51 goes to ground.

Since the output pin 51 is connected by a lead 54 to the input pin 39 of the NAND gate 34, the change in state of the NAND gate 50 to cause the output pin 51 to go to ground results in the input to the pin 39 dropping to ground. Since the input through the pin 38, which is connected by the lead 37 to the output pin 33 of the NAND gate 30, is positive, the NAND gate 34 changes state and produces a positive voltage on the output pin 35. This results in the NAND gate 30 having a positive input supplied to the pin 32, which is connected to the pin 35 by the lead 36, whereby the NAND gate 30 has its output changed to ground from positive. The input pin 31 becomes positive as soon as the transistor 29 ceased to conduct.

When the output pin 33 of the NAND gate 30 goes to ground, this results in the transistor 40 being turned off. It also increases the signal on the lead 47 from ground to positive since the NAND gate 43 changes state.

At the same time, the positive output on the pin 35 is transmitted through a capacitor 55 and a resistor 56 as an input to the base of an NPN transistor 57, which has its collector connected to the capacitor 49 and its emitter grounded. Accordingly, when the positive signal from the NAND gate 34 arrives at the base of the transistor 57, the capacitor 49 is discharged through the transistor 57.

If another noise pulse from the amplifier 11 should arrive on the input lead 28 before the capacitor 49 is discharged through the transistor 57, the noise pulse is supplied through a capacitor 58, a blocking diode 59, and a lead 60 to cause the transistor 57 to be turned on by supplying the signal from the lead 60 through the capacitor 55 and the resistor 56. As a result, whenever a second noise pulse arrives at the input to the network 12 before the completion of the charging of the capacitor 49, the capacitor 49 is discharged through the transistor 57, and the timing cycle starts again. Thus, the outputs from the network 12 through the lead 47 and the lead 20 do not cease until the predetermined period of time has existed after receipt of a noise pulse at the input lead 28.

The filter 17, which passes only signals having the frequencies of voltages created by sparks at the machining gap, is connected by a lead 61 to a tool 62 and by a lead 63 to a workpiece 64, which is supported on a tool frame 64'. The workpiece 64 is maintained at the positive potential while the tool 62 is maintained at the negative potential by the DC power supply to produce the ECM process.

The filter 17 includes a plurality of capacitors and resistors. These resistors and capacitors cooperate to allow the passage of only voltages in the frequency range at which sparks are produced between the tool 62 and the workpiece 64.

The output of the filter 17 is supplied through a lead 65 to the amplifier 18. The amplifier 18 comprises three PNP transistors. Accordingly, when a transistor 66 of the amplifier 18 conducts due to an input to the amplifier 18 through the lead 65, the voltage on a lead 67, which connects the amplifier 18 to the pulse shaping and timing network 19, increases. The amplifier 18 includes a potentiometer 68, which is adjusted to vary the gain of the amplifier 18.

The lead 67 is connected both to the base of the transistor 41 and to the collector of the transistor 40. The signal on the lead 67 is supplied to the transistor 41 only when the transistor 40 is not in a conductive state. Thus, in order for the transistor 41 to conduct, it is necessary for there to be no signal supplied to the transistor 40 from the lead 20 of the network 12. Accordingly, only a noise pulse, which arrives at the network 19 earlier than the noise pulse arrives at the network 12, or a signal due to a spark occurring across the gap can turn on the transistor 41. Thus, any noise pulse arriving at the network 19 after a noise pulse arrives at the network 12 cannot turn on the conductor 41. This insures that additional noise pulses will not pass through the network 19 to the comparator 14.

Whenever the transistor 41 conducts, the voltage on an input pin 69 of a NAND gate 70 drops. Since a high voltage exists on input pin 71 of the NAND gate 70, the voltage on output pin 72 of the NAND gate 70 increases from ground to positive when the input pin 69 has a low voltage thereon from the transistor 41 conducting.

Before the NAND gate 70 changes state, the input pin 71 is positive because it is connected by a lead 73 to output pin 74 of a NAND gate 75. The output pin 74 of the NAND gate 75 is positive because its input pin 76 is connected by a lead 77 to the output pin 72 of the NAND gate 70. Before the NAND gate 70 changes state due to the transistor 41 conducting, the output pin 72 is at ground. Thus, the input pin 76 of the NAND gate 75 is at ground so that the voltage on the output pin 74 is positive.

The NAND gate 75 has its other input pin 78 maintained at a positive voltage. Thus, with the input pin 76 at a low voltage and the input pin 78 at a high voltage, the NAND gate 75 has a positive voltage on the output pin 74.

As soon as the NAND gate 70 changes state so that the output pin 72 has a positive voltage thereon, the input pin 76 has a positive voltage thereon. As a result, the NAND gate 75 changes state so that the voltage on the output pin 74 goes to ground. When this occurs, the input pin 71 of the NAND gate 70 drops to ground.

Accordingly, when the transistor 41 ceases to conduct after the short period during which an input is supplied thereto from the amplifier 18 by the lead 67, the NAND gate 70 will remain in the state in which the output pin 72 is positive. This is because the input pin 71 has its voltage drop to ground due to the change in state of the NAND gate 75 resulting from the NAND gate 70 changing state. Therefore, the output voltage on the pin 72 remains positive even after the transistor 41 ceases to conduct.

Since the output pin 72 of the NAND gate 70 is connected to input pins 78' and 79 of a NAND gate 80 by a lead 81, the NAND gate 80 changes state when the NAND gate 70 changes state. Accordingly, the voltage on output pin 82 of the NAND gate 80 goes to ground when the output pin 72 of the NAND gate 70 has a positive voltage thereon.

The output pin 82 of the NAND gate 80 is connected through an RC circuit, which comprises a capacitor 83 and a resistor 84, to input pins 85 and 86 of a NAND gate 87. However, since the input pins 85 and 86 are already at ground through the resistor 84, the changing of the voltage on the output pin 82 of the NAND gate 80 from the positive to ground does not change the state of the NAND gate 87. Thus, the state of the NAND gate 87 is not affected by the voltage of the output pin 82 of the NAND gate 80 going to ground.

When the output pin 72 of the NAND gate 70 becomes positive, a capacitor 88 is charged through a resistor 89. The capacitor 88 and the resistor 89 cooperate to determine the period during which the pulse, which is received by the transistor 41, is delayed within the network 19 before being supplied to the comparator 14. The capacitance of the capacitor 88 and the resistance of the resistor 89 are selected to provide the desired time delay of the input to the network 19 before it is transmitted as an output to the comparator 14.

As the capacitor 88 charges, its potential increases until it causes the voltage on an output pin 90 of a NAND gate 91 to go to ground. This occurs when input pins 92 and 93 of the NAND gate 91 become sufficiently positive due to the potential on the capacitor 88 increasing.

When the output pin 90 of the NAND gate 91 has its voltage drop to ground, this signal is supplied through a lead 94 to the input pin 78 of the NAND gate 75. Since the voltage on the input pin 76, which is connected by the lead 77 to the output pin 72 of the NAND gate 70, is positive, the low signal to the input pin 78 results in the voltage on the output pin 74 of the NAND gate 75 becoming positive. Since the output pin 74 is connected to the input pin 71 of the NAND gate 70 by the lead 73, the positive voltage on the output pin 74 produces a positive voltage on the input pin 71 of the NAND gate 70 to cause the potential on the output pin 72 to go to ground since the input pin 69 is positive as there is no conduction of the transistor 41.

when the potential on the output pin 72 of the NAND gate 70 goes to ground, the NAND gate 80 changes state since the voltage on the input pins 78' and 79 changes from positive to ground. As a result, the voltage on the output pin 82 increases from ground to positive. During the time that the voltage on the output pin 82 increases from ground to positive, the voltage passes through the capacitor 83 to produce a positive signal on the input pins 85 and 86 of the NAND gate 87. However, as soon as the voltage on the output pin 82 reaches its maximum steady positive state, any further input to the input pins 85 and 86 is stopped by the capacitor 83 since it will not pass DC voltage. Thus, while the input pins 85 and 86 of the NAND gate 87 are positive for a short period of time to change the voltage on output pin 95 of the NAND gate 87, the NAND gate 87 again changes its state due to ceasing of any voltage being supplied to the capacitor 83 so that the voltage on the input pins 85 and 86 returns to ground.

Figure 4:
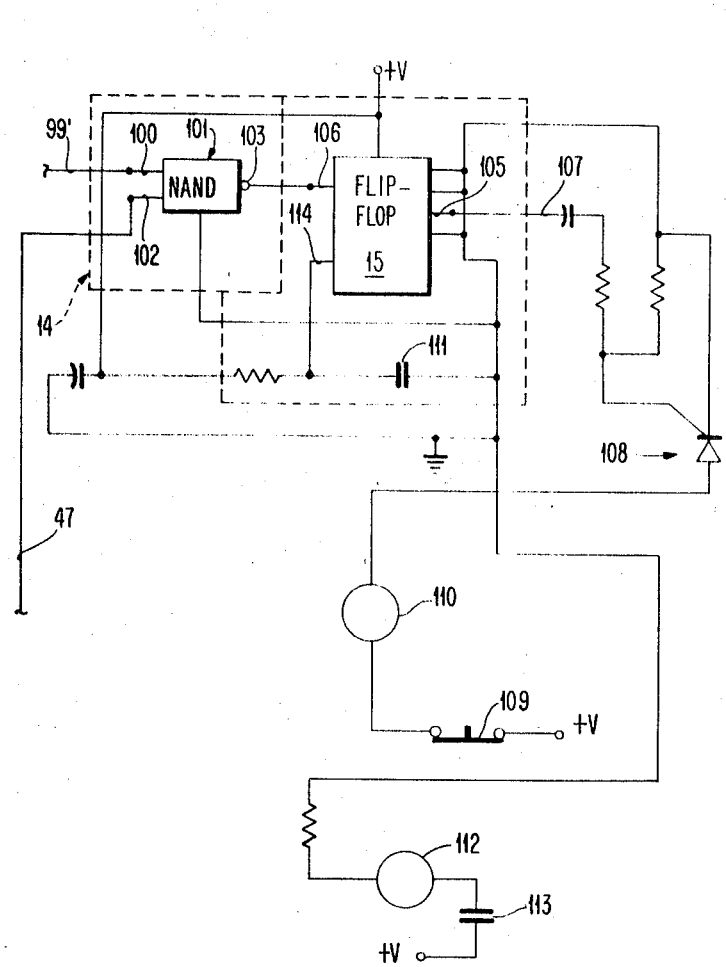
FIG. 4 is a schematic wiring diagram of a comparator for comparing the outputs of the networks of FIGS. 2 and 3, a flip-flop circuit, a circuit for stopping the ECM power supply, and a circuit for manually resetting the multivibrator of the flip-flop circuit.

However, during the time that the voltage on the output pin 95 goes to ground because the potential on the input pins 85 and 86 of the NAND gate 87 is positive, the voltage on input pins 96 and 97 of a NAND gate 98 also go to ground. As a result, the voltage on output pin 99 of the NAND gate 98 becomes positive. The output pin 99 of the NAND gate 98 is connected by a lead 99' to an input pin 100 (see FIG. 4) of a NAND gate 101, which forms the comparator 14. The NAND gate 101 has its other input pin 102 connected to the lead 47.

As previously mentioned, the lead 47 has a positive voltage thereon unless the network 12 is receiving an input due to noise within the frequency range of the filter 10. Accordingly, when the network 19 supplies an output through the output pin 99 to the input pin 100 of the NAND gate 101 and there is no input to the network 12 so that the lead 47 has a positive voltage thereon, both of the pins 100 and 102 of the NAND gate 101 are receiving positive potentials. As a result, the NAND gate 101 changes state so that the voltage on its output pin 103 goes to ground.

When the output pin 103 of the NAND gate 101 goes to ground, it causes the flip-flop circuit 15 to change the state on its output pin 105 from ground to positive. The output pin 103 of the NAND gate 101 is connected to the flip-flop circuit 15 through an input pin 106 of the flip-flop circuit 15. One suitable example of the flip-flop circuit 15 is sold as integrated circuit model No. SN7474N by Texas Instruments.

The potential on the pin 105 is supplied by a lead 107 to a gate of a silicon controlled rectifier 108. When the output pulse on the pin 105 of the flip-flop circuit 15 is supplied to the gate of the silicon controlled rectifier 108, current flows from a positive source of voltage through a push button 109 and a control relay 110 to pick the relay 110. When the relay 110 is picked, the DC power supply to the tool 62 and the workpiece 64 is stopped.

When the DC power supply is stopped through the relay 110 being picked, normally open contacts 111 of a relay 112 will be closed since the relay 112 is picked through normally open contacts 113 of a relay (not shown) closing when the DC power supply is stopped. Accordingly, closing of the normally open contacts 111 connects input pin 114 of the flip-flop circuit 15 to ground so that the output pin 105 of the flip-flop circuit 15 changes state to stop the supply of a signal to the gate of the silicon controlled rectifier 108. This insures that the silicon controlled rectifier 108 cannot be turned on when the push button 109 is returned to its closed position.

In order to start the ECM process after the DC power supply has been stopped by the present invention, it is necessary to first actuate the push button 109 to open the circuit through the relay 110 and the silicon controlled rectifier 108 to deenergize the relay 110 and turn off the silicon controlled rectifier 108. Then, the DC power supply may be started. Of course, it is necessary to return the push button 109 to the closed position after it has been moved to the open position so that the DC power supply may be interrupted if another spark occurs.

As previously mentioned, the potential on the capacitor 88 increases sufficiently to cause the NAND gate 91 to change state; this causes the NAND gate 75 to change state so that the voltage on the output pin 74 becomes positive. The output pin 74 of the NAND gate 75 is connected not only to the input pin 71 of the NAND gate 70 but also through a lead 115 to the base of a NPN transistor 116.

Accordingly, when the output pin 74 of the NAND gate 75 becomes positive, the capacitor 88 may discharge to ground through the transistor 116. When this occurs, the NAND gate 91 again changes state so that the output pin 90 becomes positive. This supplies a positive voltage to the input pin 78 of the NAND gate 75.

Therefore, when the next input is supplied to the network 19, the input pin 78 of the NAND 75 will be positive. Thus, when the output pin 72 of the NAND gate 70 becomes positive due to the next input to the transistor 41, the positive signal on the pin 78 cooperates with a positive signal received on the input pin 76 to cause the NAND gate 75 to have the potential on the output pin 74 go to ground. Thus, this change in the voltage of the output pin 74 not only results in the NAND gate 70 being maintained in the state in which the output pin 72 is positive but also prevents the transistor 116 from conducting as the potential on the capacitor 88 builds up.

Figure 5:
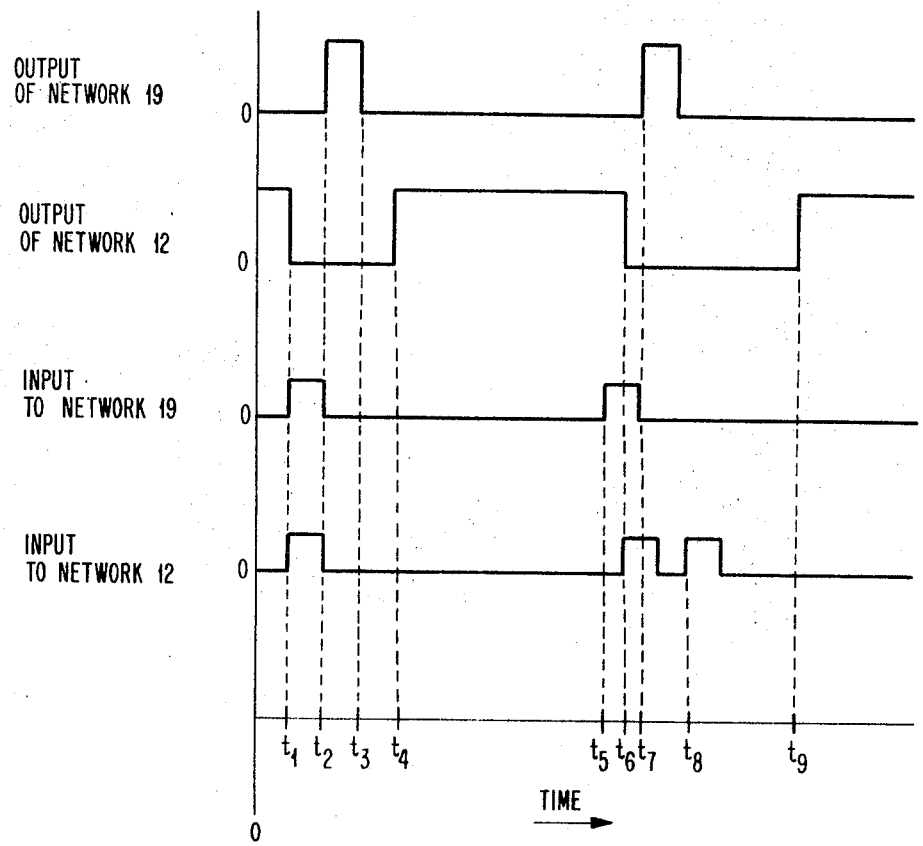
FIG. 5 is a timing chart showing the relation of input and output pulses of the networks of FIGS. 2 and 3.

Considering the operation of the present invention and referring to FIG. 5, a noise pulse is received at time $t_1$ simultaneously as an input to both the network 12 and the network 19. This causes an output pulse to appear on both the leads 20 and 47 of the network 12 upon receipt of the pulse at the time $t_1$ at the input of the network 12.

However, the output from the network 19 through the output pin 99 of the NAND gate 98 is differentiated by the capacitor 83. This is so that the output from the network 19 does not begin until the noise input pulse has expired. This is when the output of the NAND gate 80 returns to the positive level after the time cycle is completed. This insures that any phase mismatch between the noise arriving at the input of the network 12 and the input of the network 19 results in the output from the network 12 reaching the comparator 14 earlier than the output of the network 19 to the comparator 14.

The output pulse from the network 19, which starts at time $t_2$, ceases at time $t_3$ while the output from the network 12 continues until time $t_4$. The time between $t_3$ and $t_4$ also is equal to the width of one of the noise input pulses so that this compensates for any component mismatch between the network 12 and the network 19.

If a noise input pulse arrives at the network 19 at time $t_5$ while the noise input pulse does not arrive at the network 12 until time $t_6$, the time delay of the network 19 is sufficient so that the output of the network 12 is supplied to the comparator 14 before the output of the network 19 is supplied to the comparator 14. Thus, the output from the network 12 is supplied at time $t_6$, which is the time when the input is supplied to the network 12, while the output from the network 19 is supplied as an input to the comparator 14 at time $t_7$.

When the noise pulse is received at the network 12 at time $t_6$, it also prevents any further signals being received by the network 19 for a predetermined period of time. Thus, if another noise pulse is received at time $t_8$ by the network 12, this input pulse will not be received by the network 19 for shaping and supply to the comparator 14 but will be inhibited therefrom due to the transistor 40 being turned on.

Furthermore, when the noise pulse, which is received at time $t_8$, enters the network 12, it causes the transistors 57 to be turned on to discharge the capacitor 49. Accordingly, the time period during which an output of the network 12 is transmitted through the leads 20 and 47 has its time started again. That is, the time from $t_8$ to $t_9$, which is when an output of the network 12 ceases that begun at time $t_6$, is equal to the time between $t_1$ and $t_4$.

Of course, if an input is received only at the network 19 and not at the network 12, then this is a signal indicating that a spark has occurred at the gap, and it is desired to stop the ECM power supply. Accordingly, when this occurs, the comparator 14 receives an input from the network 19 but does not receive an input from the network 12. This results in the NAND gate 101 conducting because there is a positive voltage on the lead 47 when there is no output from the network 12, and there is a positive output from the pin 99 of the NAND gate 98 of the network 19 when there is an output from the network 19.

Thus, the NAND gate 101 conducts and causes the flip-flop circuit 15 to change state. This causes the silicon controlled rectifier 108 to be turned on whereby the relay 110 is picked. The picking of the relay 110 shuts down the DC power supply to the tool 62 and the workpiece 64.

When the power supply shuts down, the normally open contacts 111 close to change the state of the flip-flop circuit 15. Furthermore, the output from the network 19 to the comparator 14 exists for a very short period of time because the capacitor 83 allows a positive voltage to be applied to the input pins 85 and 86 of the NAND gate 87 only during the time when the voltage on the output pin 82 is rising from ground to its maximum positive potential.

When it is desired to again apply the DC power supply to the tool 62 and the workpiece 64, it is necessary to actuate the reset push button 109 to deenergize the relay 110 and inactivate the silicon controlled rectifier 108. Then, the push button 109 is returned to its closed position but the silicon controlled rectifier 108 will not turn on due to the absence of a signal at its gate since the flip-flop circuit 15 has returned to its original state in which there is no potential on the output pin 105. Then, the start button for the power supply may be activated to allow power to again be supplied to the tool 62 and the workpiece 64.

An advantage of this invention is that it insures that machining will not be stopped by noise. Another advantage of this invention is that more efficient electrochemical machining is obtained since only sparks across the gap will stop machining. A further advantage of this invention is that the sensitivity of the system is independent of the machining voltage occurring at the gap so that sensitivity does not have to be changed for different jobs. Still another advantage of this invention is that the detecting system is immune to electrical noise and line transients without any decrease in sensitivity to the sparks.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. In an electrical sensing system for sensing a spark across a machining gap of an ECM apparatus during machining, the system including:

first means to detect the presence of a high frequency voltage across the gap;

second means, separate from the said first means, to produce an output in response to noise only in the frequency range of the gap voltage;

third means to receive inputs from said first means and said second means, said third means producing an output when it receives an input only from said first means;

and means responsive to the output from said third means to stop machining.

2. The system according to claim 2 in which said second means includes means to inhibit any input to said first means for a predetermined period of time after said second means receives an input.

3. The system according to claim 1 in which:

said first means includes filter means to limit its input to a predetermined range of frequencies encompassing the frequencies at which high frequency voltages appear across the gap to indicate sparking;

and said second means includes filter means to limit its inputs to substantially the same predetermined range of frequencies as said first means.

4. The system according to claim 2 in which:

said first means includes filter means to limit its input to a predetermined range of frequencies encompassing the frequencies at which high frequency voltages appear across the gap to indicate sparking;

and said second means includes filter means to limit its inputs to substantially the same predetermined range of frequencies as said first means.

5. The system according to claim 1 in which:

said second means includes means to form pulses of a predetermined time width in response to each of its inputs;

and said pulse forming means including means to restart timing of the predetermined time width of the pulse when a second input is received before completion of formation of the pulse of the predetermined time width.

6. The system according to claim 1 including means to insure that said third means receives an input from said second means before said third means receives an input from said first means due to the same noise even if phase mismatch causes said first means to detect the noise before said second means receives the noise.

7. The system according to claim 1 including delay means to delay the input from said first means to said third means to cause said third means to receive an input from said second means before it receives an input from said first means due to the same noise even if phase mismatch causes said first means to detect the noise before said second means receives the noise.

8. The system according to claim 1 in which said second means includes means responsive to each of its inputs to form a pulse of a time width three times the time width of its input.

9. The system according to claim 1 in which said first means includes means to limit the time period during which said third means receives an input from said first means due to said first means detecting the presence of a high frequency voltage across the gap.

10. The system according to claim 2 including means to render said inhibiting means inactive when said second means ceases to supply an input to said third means.

11. The system according to claim 5 including means to insure that said third means receives an input from said second means before said third means receives an input from said first means due to the same noise even if phase mismatch causes said first means to detect the noise before said second means receives the noise.

* * * * *

UNITED STATES PATENT OFFICE
CERTIFICATE OF CORRECTION

Patent No. 3,652,440          Dated  March 28, 1972

Inventor(s) Gareth A. Dehner

It is certified that error appears in the above-identified patent and that said Letters Patent are hereby corrected as shown below:

Column 1, line 42, cancel "vice". Column 2, line 35, "OF" should read -- Of -- . Column 3, line 41, "Pin" should read -- pin -- . Column 5, line 67, cancel "the", second occurrence. Column 6, line 24, "when" should read -- When -- . Column 9, line 3, cancel "the" ; line 11, cancel "claim 2" and insert -- claim 1 -- .

Signed and sealed this 31st day of October 1972.

(SEAL)
Attest:

EDWARD M. FLETCHER, JR.            ROBERT GOTTSCHALK
Attesting Officer                  Commissioner of Patents